US012706674B2

(12) United States Patent
Kim et al.

(10) Patent No.: US 12,706,674 B2
(45) Date of Patent: Aug. 11, 2026

(54) ANOMALY MONITORING OF BIDIRECTIONAL OPTICAL LINKS

(71) Applicant: 1FINITY Inc., Kawasaki (JP)

(72) Inventors: Inwoong Kim, Allen, TX (US); Olga I Vassilieva, Plano, TX (US); Ryu Shinzaki, Kawasaki (JP); Motohiko Eto, Kawasaki (JP); Shoichiro Oda, Kawasaki (JP); Paparao Palacharla, Richardson, TX (US)

(73) Assignee: 1FINITY Inc., Kawasaki (JP)

( * ) Notice: Subject to any disclaimer, the term of this patent is extended or adjusted under 35 U.S.C. 154(b) by 296 days.

(21) Appl. No.: 18/544,125

(22) Filed: Dec. 18, 2023

(65) Prior Publication Data

US 2025/0202577 A1 Jun. 19, 2025

(51) Int. Cl.

*H04B 10/079* (2013.01)
*G01M 11/00* (2006.01)
*H04B 10/25* (2013.01)

(52) U.S. Cl.

CPC ....... *H04B 10/07955* (2013.01); *G01M 11/30* (2013.01); *H04B 10/2589* (2020.05)

(58) Field of Classification Search

CPC ............ H04B 10/0771; H04B 10/0791; H04B 10/294; H04B 10/07953; H04B 10/07955; H04B 10/0795; H04B 10/07951; H04B 10/0793; H04B 10/2507; H04B 10/2589; H04J 14/02216; H04J 14/02219; G01M 11/30

See application file for complete search history.

(56) References Cited

U.S. PATENT DOCUMENTS

2014/0133845 A1 * 5/2014 Dahlfort ............ H04L 41/0677 370/242

FOREIGN PATENT DOCUMENTS

EP 3982559 A1 * 4/2022 .......... H04B 10/071

* cited by examiner

*Primary Examiner* — Hibret A Woldekidan
(74) *Attorney, Agent, or Firm* — Maschoff Brennan

(57) ABSTRACT

A method may include obtaining a first power profile estimation (PPE) for a first optical signal propagating through an optical link in a first direction. The method may include obtaining a second PPE for a second optical signal propagating through the optical link in a second direction opposite the first direction. The method may also include generating an optical link analysis indicating one or more locations along the optical link that apply a gain or loss to optical signals propagating through the optical link.

17 Claims, 6 Drawing Sheets

200

Obtaining A First Power Profile Estimation (PPE) For A First Optical Signal Propagating Through An Optical Link In A First Direction — 202

Obtaining A Second PPE For A Second Optical Signal Propagating Through The Optical Link In A Second Direction Opposite The First Direction — 204

Generating An Optical Link Analysis Based On The First PPE And The Second PPE, The Optical Link Analysis Indicating One Or More Locations Along The Optical Link That Apply One Or More Of A Gain Or A Loss To Optical Signals Propagating Through The Optical Link — 206

ANOMALY MONITORING OF BIDIRECTIONAL OPTICAL LINKS

FIELD

The embodiments discussed herein are related to anomaly monitoring of bidirectional optical links.

BACKGROUND

Telecommunications systems, cable television systems, and data communication networks use optical networks to convey information between remote points. In an optical network, information is conveyed in the form of optical signals through optical links such as those made of optical fibers or other optical media. The optical networks may include various components such as amplifiers, dispersion compensators, multiplexer/demultiplexer filters, wavelength selective switches, couplers, transmitters, receivers, etc. configured to perform various operations within the optical network. In some instances, bidirectional optical links may be used to reduce the number of optical links utilized within an optical network.

The power of optical signals may vary along the length of an optical link (e.g., along the length of an optical fiber) due to various factors such as attenuation, dispersion, nonlinear effects, and/or amplification. Monitoring of optical links via a power profile estimation corresponding to the optical link and optical signals propagating thereto may be helpful for system design, optimization, optical link monitoring, and performance evaluation.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include obtaining a first power profile estimation (PPE) for a first optical signal propagating through an optical link in a first direction. The operations may also include obtaining a second PPE for a second optical signal propagating through the optical link in a second direction opposite the first direction. In addition, the operations may include generating an optical link analysis indicating one or more locations along the optical link that apply a gain or loss to optical signals propagating through the optical link.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
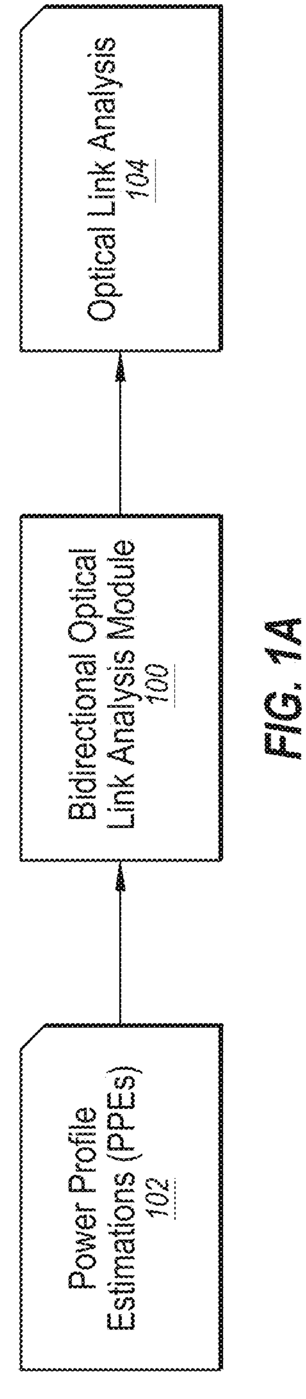
FIG. 1A illustrates an example embodiment of a system related to monitoring of optical links with at least one anomaly.

Optical networks may include nodes that may be configured to communicate information to each other via optical signals that are propagated through optical links (e.g., optical fibers). Bidirectional optical signal propagation through bidirectional optical links may be utilized to reduce the number of optical links that may be utilized within an optical network.

Further, the power distribution of optical signals as they propagate through optical links may be influenced by several factors, including attenuation, dispersion, nonlinearities, other impairments, and/or enhancements such as amplification. Monitoring of optical links may include using longitudinal power profile estimation (PPE) to estimate the power levels of optical signals at different positions along the respective optical links, which may help identify portions of the optical links that may affect optical signal propagation. However, with respect to bidirectional optical links, PPEs may vary depending on which side of the bidirectional optical links are used for transmission or reception of the optical signals used to determine the different PPEs.

According to one or more embodiments of the present disclosure, bidirectional PPE may accordingly be used to analyze bidirectional optical links. Such bidirectional PPE may be used to identify portions of the corresponding bidirectional optical links that may cause signal degradation and/or signal enhancement and accordingly may be used to improve optical network performance.

Monitoring optical signals using bidirectional PPE may include obtaining a first PPE for a first optical signal propagating through an optical link in a first direction, obtaining a second PPE for a second optical signal propagating through the optical link in a second direction opposite the first direction, and generating an optical link analysis based on the first PPE and the second PPE. The optical link analysis may indicate one or more locations along the optical link that apply a gain or loss to optical signals propagating through the optical link. The gain may include amplification of the optical signals. The loss (e.g., an anomaly loss) may include attenuation of the optical signals. The locations of losses may accordingly indicate which portions of the optical link may have an anomaly (e.g., characteristics or features affecting signal power, propagation performance, etc.). Therefore, the use of bidirectional PPE may be used to monitor anomalies in bidirectional optical links to identify portions of the bidirectional optical links that may affect signal propagation.

Such use of bidirectional PPE may result in the optical link monitoring being more accurate than with other techniques. For example, some techniques may suffer from limited resolution making them less suitable or unsuitable to detect closely spaced impairments and/or enhancements. Some conventional hardware testing devices may be placed in a span-by-span manner, which may be time consuming and/or expensive. Further, some longitudinal PPE techniques may suffer from noise when signal power drops in an optical network because of fiber attenuation. The bidirectional PPE techniques discussed herein may overcome noise concerns because bidirectional PPE may involve combining the PPE for at least two signals that propagate through the same optical link in opposite directions, which may allow for noisy portions of one PPE to be replaced and/or modified by the corresponding portion of the other PPE that is less noisy to generate a more accurate optical link analysis.

Embodiments of the present disclosure will be explained with reference to the accompanying drawings.

FIG. 1A illustrates an example embodiment of a bidirectional optical link analysis module 100 ("module 100") configured to generate an optical link analysis 104 based on power profile estimations 102 ("PPEs 102"), arranged in accordance with at least some embodiments of the present disclosure.

In some embodiments, the optical link analysis 104 and the PPEs 102 may correspond to an optical link. The optical link may include any suitable combination of optical components that an optical signal may propagate through between an optical transmitter and an optical receiver. In these and other embodiments, the optical link may include a bidirectional optical link having optical transceivers at each end. The bidirectional optical link may be such that optical signals may propagate in both directions via the same optical components. For example, in a bidirectional optical link, optical signals may travel in both directions through a same optical fiber included in the bidirectional optical link.

The PPEs 102 may include any power profile estimations that may correspond to the optical link. In these and other embodiments, one or more of the PPEs 102 may be determined based on any longitudinal power profile estimation technique. For example, the PPEs 102 may include estimates of optical signal power based on the nonlinear interference noise (NLI noise) and accumulated chromatic dispersion at one or more positions along an optical link. In some embodiments, the PPEs 102 may be based on a Minimum Mean Square Error (MMSE) technique. Additionally or alternatively, the PPEs 102 may be based on a correlation-based method (CM). In these and other embodiments, one or more of the PPEs 102 may be determined based on signal power, signal wavelength, signal modulation scheme (e.g., amplitude and/or phase), chromatic dispersion, signal polarization state, optical signal-to-noise ratio (OSNR), and/or any other information about an optical signal. For example, one or more of the PPEs 102 may be determined based on chromatic dispersion and nonlinear interference noise. For instance, one or more of the PPEs 102 may be determined based on the modal dispersion of different wavelengths of light as optical signals propagate through a corresponding optical link.

In some embodiments, one or more of the PPEs 102 may be obtained by the module 100 determining such PPEs 102. For example, the module 100 may include or be part of a computing system that may be configured to generate the optical link analysis based on the PPEs 102. Additionally or alternatively, one or more of the PPEs 102 may be obtained by the module 100 receiving such PPEs 102 from one or more other suitable devices that are configured to determine PPEs 102 and that are communicatively coupled to the module 100. For example, the PPEs 102 may be generated by a computing system that receives information from one or more optical transceivers about one or more optical signals propagating through an optical link. In some embodiments, such a computing system may determine one or more of the PPEs 102 based on such information and may communicate the determined PPEs 102 to the module 100.

In some embodiments, the PPEs 102 may be bidirectional PPEs. For example, bidirectional PPEs may include estimations of the optical signal power of at least two optical signals propagating through an optical link in opposite directions for one or more locations along the optical link.

Figure 1B:
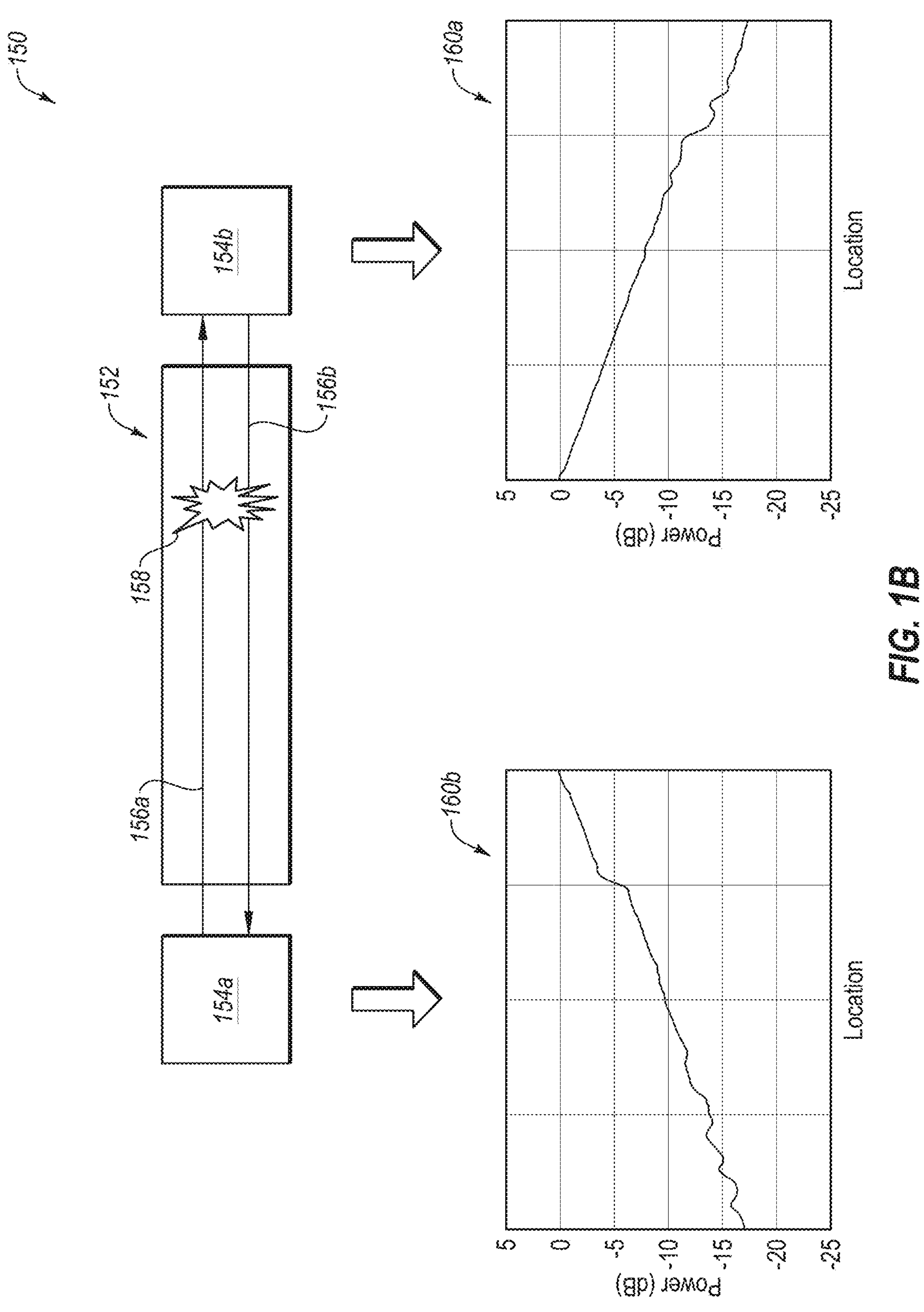
FIG. 1B illustrates an example embodiment of a system related to obtaining PPEs.

By way of example, FIG. 1B illustrates an example operating environment 150 for obtaining a first PPE 160*a* and a second PPE 160*b* (collectively PPEs 160). The first PPE 160*a* may correspond to propagation of one or more optical signals in a first direction 156*a* from a first optical transceiver 154*a* to a second optical transceiver 154*b* via an optical link 152. The second PPE 160*b* may correspond to propagation of one or more optical signals in a second direction 156*b* from the second optical transceiver 154*b* to the first optical transceiver 154*a* via the optical link 152. Therefore, the first PPE 160*a* and the second PPE 160*b* may correspond to the same optical link 152 but may be based on optical signals that propagate in opposite directions along the optical link 152. Additionally or alternatively, the first PPE 160*a* and the second PPE 160*b* may be considered "bidirectional PPEs" with respect to each other.

In the illustrated example of FIG. 1B, the optical link 152 may include an anomaly 158. The anomaly 158 may be one or more characteristics or features of and/or within the optical link 152 that affects optical signal power and/or propagation performance. For example, the anomaly 158 may be a bend and/or curve in the optical link 152, a fiber cut, fiber tapping, and/or anything that may cause a sudden drop of signal power. In some embodiments, the first PPE 160*a* and/or the second PPE 160*b* may indicate that optical signals propagating throughout the optical link 152 experience a loss at a location along the optical link 152 where the anomaly 158 is present. The loss may attenuate the optical signals. The locations of losses within the first PPE 160*a* and/or the second PPE 160*b* may accordingly indicate which portions of the optical link 152 may have an anomaly 158.

Within the illustrated example of FIG. 1B, the anomaly 158 is indicated within the first PPE 160*a* by the arrow in the first PPE 160*a* and within the second PPE 160*b* by the arrow in the second PPE 160*b*. In some embodiments, the location of the anomaly 158 within the optical link 152 may be indicated in different portions of the first PPE 160*a* as compared to the second PPE 160*b* because of a difference in distance between the second optical transceiver 154*b* and the anomaly 158 compared to the distance between the first optical transceiver 154*a* and the anomaly 158. For example, in FIG. 1B the anomaly 158 may be indicated near the end of the first PPE 160*a* because the anomaly 158 may be present along the optical link 152 at a location near the opposite end of the optical link 152 from the first optical transceiver 154*a*. As a further example, in FIG. 1B the anomaly 158 may be indicated near the beginning of the second PPE 160*b* because the anomaly 158 may be present along the optical link 152 at a location near to the second optical transceiver 154*b*. Additionally or alternatively, the anomaly 158 may be indicated in the first PPE 160*a* and/or the second PPE 160*b* based on increased noise. For example, the first PPE 160*a* and the second PPE 160*b* as illustrated in FIG. 1B have increased noise for portions corresponding to after the anomaly 158 has been indicated within each of the first PPE 160*a* and the second PPE 160*b*.

Returning to FIG. 1A, as indicated above, the module 100 may be configured to obtain the PPEs 102 and to generate the optical link analysis 104 based on the PPEs 102. In some embodiments, the module 100 generating the optical link analysis 104 based on the PPEs 102 may include combining portions of two or more PPEs 102 in which each of the PPEs 102 has the greater optical signal power indicated. Additionally or alternatively, the module 100 may be configured to generate the optical link analysis 104 based on one or more processing operations.

In some embodiments, the module 100 may be included in or implemented by any suitable computing system. For example, the module 100 may be implemented using hardware including one or more processors, central processing units (CPUs) graphics processing units (GPUs), data processing units (DPUs), parallel processing units (PPUs), microprocessors (e.g., to perform or control performance of one or more operations), programmable vision accelerators (PVAs)—which may include one or more direct memory access (DMA) systems and/or one or more vector or vision processing units (VPUs), field-programmable gate arrays (FPGA), application-specific integrated circuits (ASICs), accelerators (e.g., deep learning accelerators (DLAs)), and/or other processor types. Additionally or alternatively, the module 100 may be implemented using a combination of hardware and software. In the present disclosure, operations described as being performed by the module 100 may include operations that the module 100 may direct one or more corresponding computing systems to perform. In these or other embodiments, the module 100 may be implemented by one or more computing systems, such as that described in further detail with respect to FIG. 3. Additionally or alternatively, the one or more computing systems on which the module 100 may be deployed may include a digital signal processing system included in an optical transceiver.

In some embodiments, the optical link analysis 104 may include data in any form that indicates performance of optical signal propagation through the optical link. For example, the optical link analysis 104 may indicate one or more anomalies of the optical link. For example, the optical link analysis 104 may be an anomaly detection signal representation configured to indicate one or more locations along the optical link that apply a loss to optical signals propagating through the optical link. In some embodiments, the loss may attenuate optical signals. For example, a gain may correspond to an amplification that may be caused by a doped fiber and/or some other type of optical amplifier. Additionally or alternatively, a loss may correspond to an attenuation that may be greater than an expected attenuation corresponding to propagation distance. In some embodiments, the optical link analysis 104 may be a graphical representation corresponding to an optical link. For example, in instances in which the optical link analysis 104 is a graphical representation, the shape of the optical link analysis 104 (e.g., peaks, troughs, slope, etc.) may indicate where one or more anomalies are present within the optical link.

In these and other embodiments, an anomaly may be any behavior that deviates from the expected propagation of an optical signal through the optical link. For example, an anomaly may be optical fiber breakage and/or bending.

In some embodiments, the optical link analysis 104 may help improve optical networks in general. For example, one or more components of the optical link may be adjusted based on the optical link analysis 104. For instance, the optical link analysis 104 may indicate that a component may need to be replaced. Further, one or more properties of the transmitted bidirectional optical signals may be adjusted based on the optical link analysis 104 to help counteract adverse effects that may be experienced by the bidirectional optical signals and that may be indicated by the optical link analysis 104.

Further, the optical link analysis 104 may allow for anomalies that apply a loss to optical signals propagating through the optical link to be mitigated using any suitable technique. For example, in optical inks with hybrid Erbium-Doped Fiber Amplifier (EDFA) and Raman amplification, launch power and/or pump power may be adjusted depending on the type and/or location of anomaly within an optical link to reoptimize transmission performance. A robust and accurate optical link analysis 104 may accordingly help simplify operations and troubleshooting of disaggregated optical networks.

Figure 1C:
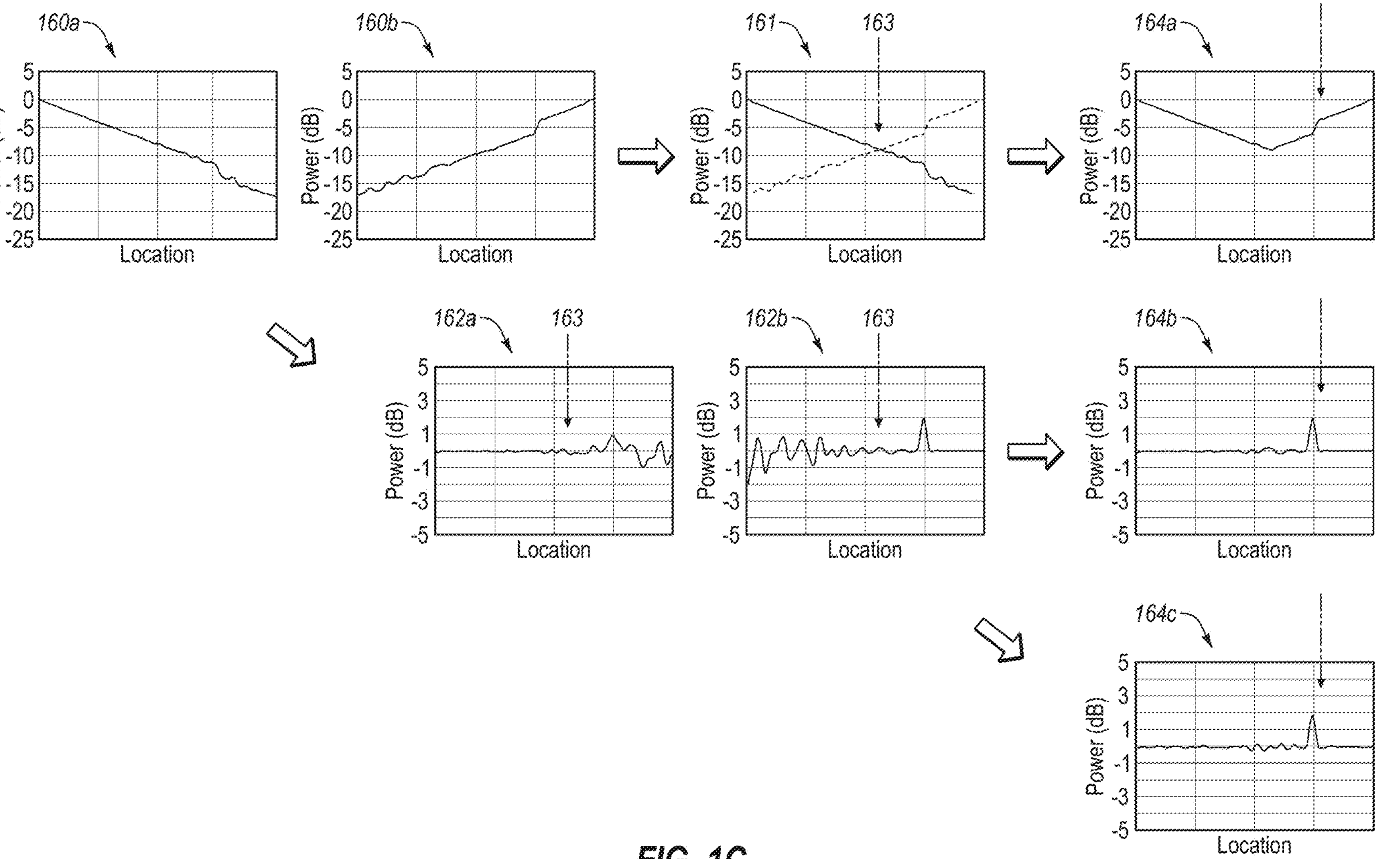
FIG. 1C illustrates an example embodiment of a system related to generating an optical link analysis based on PPEs.

FIG. 1C illustrates example depictions corresponding to processing operations that may be performed by the module 100 as part of and/or prior to generating one or more optical link analyses 164*a*, 164*b*, 164*c* (generally optical link analysis 164) according to one or more embodiments of the present disclosure. The processing operations of FIG. 1C are described with respect to the first PPE 160*a* and second PPE 160*b* of FIG. 1B for illustrative purposes. However, one or more of such operations may apply to any applicable PPE.

In some embodiments, the module 100 may perform the one or more processing operations to determine which portions of the first PPE 160*a* and the second PPE 160*b* to use to generate the optical link analysis 164. For example, in some embodiments, the processing operations may include identifying portions of the first PPE 160*a* that more accurately represent how optical signals propagate through the optical link than the second PPE 160*b* at one or more locations along the optical link (e.g., portions containing less optical noise). Additionally or alternatively, the processing operations may include identifying portions of the second PPE 160*b* that more accurately represent how optical signals propagate through the optical link than the first PPE 160*a* at one or more locations along the optical link.

For instance, as optical signals propagate along optical links, the overall power of the optical signals may attenuate, which may reduce the nonlinear interference noise and accordingly reduce the accuracy of corresponding PPEs. For example, as illustrated in graph 161 of FIG. 1C, the first PPE 160*a* may be greater than the second PPE 160*b* with respect to locations corresponding to the left side of a PPE crossing point 163 of the graph 161, in which the graph 161 indicates PPE as a function of distance away from the transmitter (e.g., location along the optical link) that transmits the optical signals propagating in a first direction that correspond to the first PPE 160*a*. Similarly, the second PPE 160*b* may be greater than the first PPE 160*a* with respect to locations corresponding to the right side of the PPE crossing point 163 of the graph 161.

As such, in some embodiments as part of the processing operations, portions of the first PPE 160*a* that correspond to locations that are on the left side of the PPE crossing point 163 may be identified as being more accurate than portions of the second PPE 160*b* that correspond to locations that are on the left side of the PPE crossing point 163. Similarly, in these and other embodiments as part of the processing operations, portions of the second PPE 160*b* that correspond to locations that are on the right side of the PPE crossing point 163 may be identified as being more accurate than portions of the first PPE 160*a* that correspond to locations that are one the right side of the PPE crossing point 163.

For example, as illustrated in FIG. 1C, the module 100 may combine the more accurate portions of the first PPE 160*a* (e.g., portions of the first PPE 160*a* on the left side of the PPE crossing point 163 in the graph 161) with the more accurate portion of the second PPE 160*b* (e.g., portions of the second PPE 160*b* on the right side of the PPE crossing point 163 in the graph 161) to generate an optical link analysis 164*a*. The location of an anomaly within the optical link may be indicated by the loss designated with an arrow in the optical link analysis 164*a*.

In these and other embodiments, the optical link analysis 164*a* may use and/or be based on the first PPE 160*a* or the second PPE 160*b* for any corresponding location along the optical link at which the first PPE 160*a* equals the second PPE 160*b* (e.g., for the location that corresponds to the PPE crossing point 163). For example, the first PPE 160*a* and the second PPE 160*b* may be equal at the PPE crossing point 163 illustrated in graph 161, which in some embodiments may be the location where the first optical signal and the second optical signal have propagated halfway through the optical link. In some embodiments, the PPE crossing point 163 may correspond to a location other than the location where the first optical signal and the second optical signal have propagated halfway through the optical link because of anomalies within the optical link. For instance, FIG. 1C illustrates that to generate the optical link analysis 164*a*, the module 100 may have utilized either the first PPE 160*a* or the second PPE 160*b* to generate the portion of the optical link analysis 164*a* corresponding to the location of the PPE crossing point 163.

Additionally or alternatively, as part of and/or prior to generating the optical link analysis 164, the module 100 may perform processing operations that may include applying one or more mathematical operations to the first PPE 160*a* and/or the second PPE 160*b*. For example, addition, subtraction, division, multiplication, combinations thereof, and/or linear regressions, logarithmic transformations, derivative transformations, and/or any other mathematical operation may be applied. The one or more mathematical operations may be designed to linearize, expand, contract, clean, filter, and/or clarify the data within the PPEs 160. In some embodiments, applying the one or more mathematical operations to the first PPE 160*a* and/or the second PPE 160*b* may help a user interpret the information the PPEs 160 convey that indicates the location of anomalies within the optical link. For example, applying a mathematical operation may aid in interpreting PPEs 160 as the mathematical operation may make changes in optical signal power more readily apparent (e.g., peaks within a graphical representation of the PPEs 160).

For instance, as illustrated in FIG. 1C, the one or more mathematical operations applied by the module 100 may include taking the derivative of the first PPE 160*a* to obtain a first transformed PPE 162*a* and taking the derivative of the second PPE 160*b* to obtain a second transformed PPE 162*b*. In some embodiments, information about the more accurate portions of the first PPE 160*a* and/or the second PPE 160*b* (e.g., as determined by which of the PPEs 160 as illustrated in graph 161 is greater for one or more locations along the optical link) may be used to identify the PPE crossing point 163 as may be represented in each of the first transformed PPE 162*a* and/or the second transformed PPE 162*b*. In these and other embodiments, the module 100 may combine the first transformed PPE 162*a* and the second transformed PPE 162*b* to generate an optical link analysis 164. For example, the module 100 may combine the more accurate portions of the first transformed PPE 162*a* (e.g., the portion of the first transformed PPE 162*a* that is to the left of the PPE crossing point 163 as illustrated in the first transformed PPE 162*a*) with the more accurate portions of the second transformed PPE 162*b* (e.g., the portion of the second transformed PPE 162*b* that is to the right of the PPE crossing point 163 as illustrated in the second transformed PPE 162*b*) to generate the optical link analysis 164*b* as illustrated in FIG. 1C. The location of an anomaly within the optical link may be indicated by the gain (e.g., peak) designated with an arrow in the optical link analysis 164*b*.

Additionally or alternatively, as part of and/or prior to generating the optical link analysis 164, the module 100 may perform processing operations that may include applying one or more weighting factors to the first PPE 160*a* and/or the second PPE 160*b*. In some embodiments, a first weighting factor may include an average optical signal power calculation that may be the optical signal power of the first PPE 160*a* for one or more locations along the optical link divided by the combined optical signal power of the first PPE 160*a* and the second PPE 160*b* for the one or more locations along the optical link. In some embodiments, a second weighting factor may include an average optical signal power calculation that may be the optical signal power of the second PPE 160*b* for one or more locations along the optical link divided by the combined optical signal power of the first PPE 160*a* and the second PPE 160*b* for the one or more locations along the optical link.

By way of example, in some embodiments, a first weighting factor "w1" may be represented using the following expression (1) and a second weighting factor "w2" may be represented using the following expression (2):

$$w1 = sp1/(sp1 + sp2) \tag{1}$$

$$w2 = sp2/(sp1 + sp2) \tag{2}$$

In expressions (1) and (2), "sp1" may represent the optical signal power of the first PPE 160*a* at one or more locations and "sp2" may represent the optical signal power of the second PPE 160*b* at one or more locations.

In some embodiments, as part of and/or prior to generating the optical link analysis 164, the module 100 may perform the processing operation of applying one or more weighting factors to the first transformed PPE 162*a* and/or the second transformed PPE 162*b*. For example, in some embodiments, the optical link analysis 164 may be represented by "OLA" and may be determined using the following expression (3):

$$OLA = w1 * TPPE1 + w2 * TPPE2 \tag{3}$$

In the above, expression (3), "w1" may represent the first weighting factor such as that determined using expression (1), "w2" may represent the second weighting factor such as that determined using expression (2), "TPPE1" may represent the first transformed PPE 162*a*, and "TPPE2" may represent the second transformed PPE 162*b*.

For instance, FIG. 1C illustrates generating an optical link analysis 164*c* by combining the first transformed PPE 162*a* multiplied by a first weighting factor (e.g., a first weighting factor as previously described) with the second transformed PPE 162*b* multiplied by a second weighting factor (e.g., a second weighting factor as previously described). The location of an anomaly within the optical link may be indicated by the gain (e.g., peak) designated with an arrow in the optical link analysis 164*c*.

In some embodiments, the module 100 may perform the one or more processing operations as part of and/or prior to generating the optical link analysis 164 to aid a user in monitoring where one or more anomalies is located within an optical link, such as by making it easier to interpret the bidirectional PPEs 160. For example, as illustrated in FIG. 1C, the gain (e.g., peak) indicating an anomaly within the optical link analyses 164*a*, 164*b*, 164*c* may be more readily discernable than monitoring where the anomaly is within the optical link by looking at the first PPE 160*a*, the first transformed PPE 162*a*, the second PPE 160*b*, or the second transformed PPE 162*b* alone and/or by looking at any combination thereof without the performance of any processing operations.

Figure 1D:
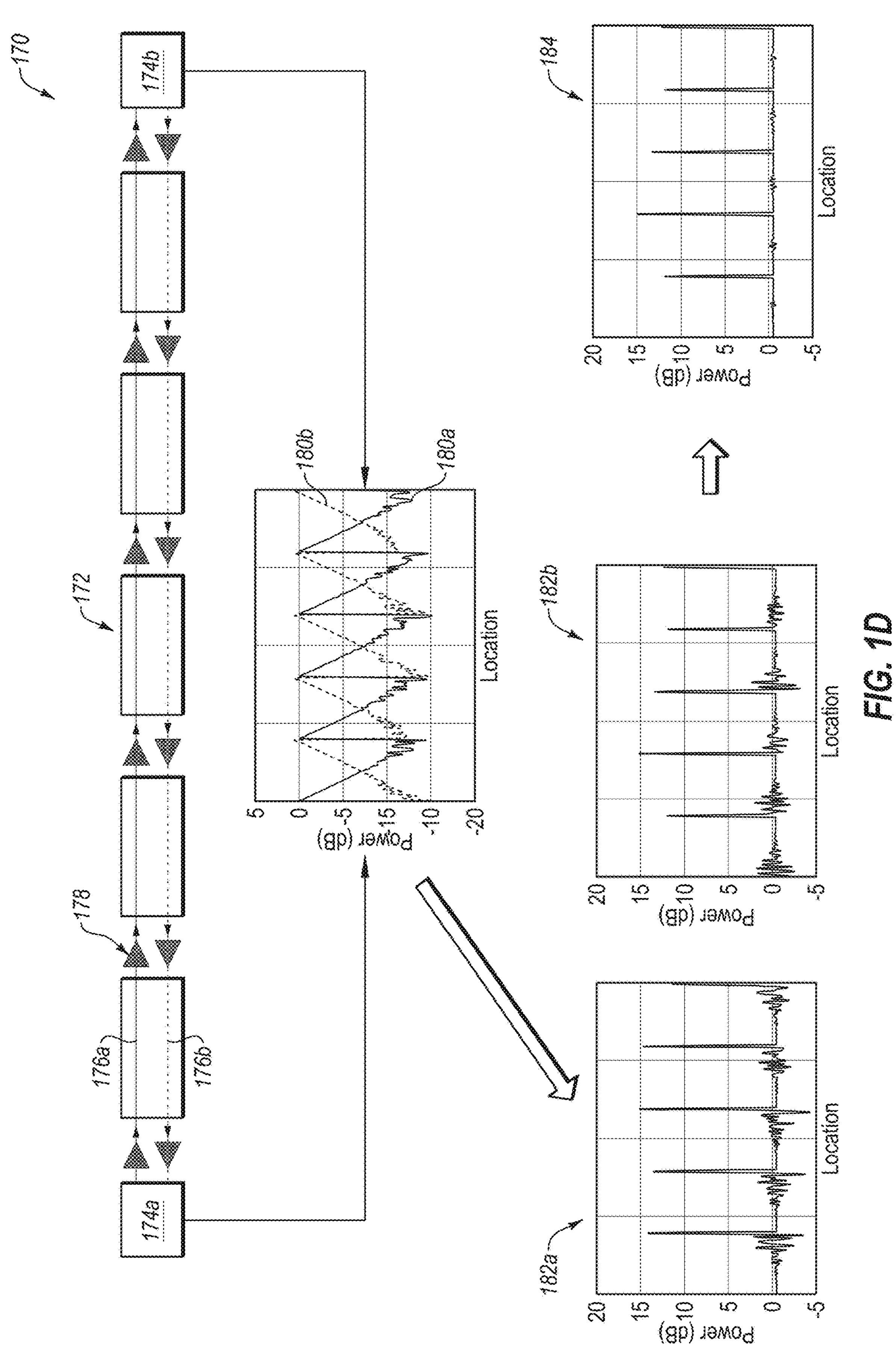
FIG. 1D illustrates an example embodiment of a system related to monitoring of optical links with at least one optical repeater.

FIG. 1D illustrates an example operating environment 170 corresponding to obtaining an optical link analysis 184 based on a first PPE 180*a* and a second PPE 180*b* of an optical link 172 with one or more optical repeaters 178. The first PPE 180*a* may correspond to propagation of one or more optical signals in a first direction 176*a* from a first optical transceiver 174*a* to a second optical transceiver 174*b* via the optical link 172. The second PPE 180*b* may correspond to propagation of one or more optical signals in a second direction 176*b* from the second optical transceiver 174*b* to the first optical transceiver 174*a* via the optical link 172. Therefore, the first PPE 180*a* and the second PPE 180*b* may correspond to the same optical link 172 but may be based on optical signals that propagate in opposite directions along the optical link 172. Additionally or alternatively, the first PPE 180*a* and the second PPE 180*b* may be considered "bidirectional PPEs" with respect to each other. In some embodiments, additional optical components, such as optical circulators, may be used to enable bidirectional transmission of optical signals at optical repeaters along an optical link.

In some embodiments, the optical repeater 178 may amplify a first optical signal 176*a* and/or a second optical signal 176*b*. For example, the optical repeater 178 may include a solid-state amplifier, a doped fiber amplifier, a semiconductor optical amplifier, a Raman amplifier, an optical parametric amplifier, and/or any optical communications repeater that may regenerate or amplify optical signals propagating through an optical link. The locations of gains within the first PPE 180*a* and/or the second PPE 180*b* may accordingly indicate which portions of the optical link 172 may have an optical repeater 178.

In some embodiments, the first PPE 180*a* and/or the second PPE 180*b* may be used as described above with respect to FIGS. 1A-1C to generate an optical link analysis 184. For example, a weighting factor and/or a mathematical operation may be applied to the first PPE 180*a* and/or the second PPE 180*b* to generate a first transformed PPE 182*a* and/or a second transformed PPE 182*b* that may be used to generate the optical link analysis 184. In some embodiments, the optical link analysis 184 for an optical link 172 with optical repeaters 178 may include peaks (e.g., spikes) indicating the location of the optical repeaters 178 along the optical link 172.

The optical link analysis 184 may use and/or be based on the first PPE 180*a* or the second PPE 180*b* for any corresponding location along the optical link at which the first PPE 180*a* equals the second PPE 180*b*. For example, the optical repeater 178 may amplify optical signals propagating through the optical link 172, which may result in multiple locations where the first PPE 180*a* equals the second PPE 180*b*.

Modifications, additions, or omissions may be made to FIGS. 1A, 1B, 1C, and/or 1D without departing from the scope of the present disclosure. For example, the anomaly 158 illustrated in FIG. 1B may be one or more anomalies. Additionally or alternatively, other specific properties and/or operations described in FIGS. 1A, 1B, 1C, and/or 1D may vary.

Figure 2:
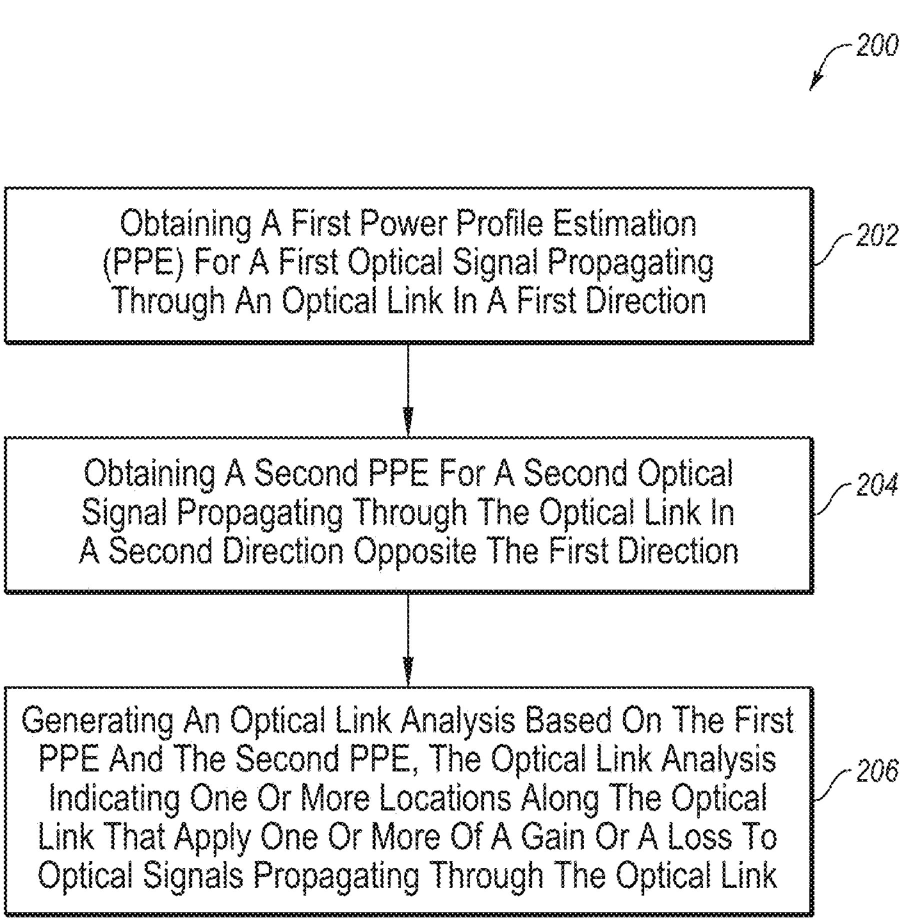
FIG. 2 is a flowchart of an example method of anomaly monitoring of bidirectional optical links.

FIG. 2 is a flowchart of an example method 200 of monitoring optical links using bidirectional PPE, according to at least one embodiment described in the present disclosure. The method 200 may be performed by any suitable system, apparatus, or device. By way of example, the module 100 described in FIG. 1A, or the computing system 300 of FIG. 3 (e.g., as directed by the module 100 in some embodiments) may perform one or more of the operations associated with the method 200. Although illustrated with discrete blocks, the steps and operations associated with one or more of the blocks of the method 200 may be divided into additional blocks, combined into fewer blocks, or eliminated, depending on the particular implementation.

At block 202, a first PPE for a first optical signal propagating through an optical link in a first direction may be obtained. In some embodiments, the first PPE described with respect to FIGS. 1A-1C may be an example of the first PPE obtained at block 202. Further, the obtaining of the first PPE may include one or more operations described with respect to FIGS. 1A and 1B.

At block 204, a second PPE for a second optical signal propagating through the optical link in a second direction opposite the first direction may be obtained. In some embodiments, the second PPE described with respect to FIGS. 1A-1C may be an example of the second PPE obtained at block 204. Further, the obtaining of the second PPE may include one or more operations described with respect to FIGS. 1A and 1B.

At block 206, in some embodiments, an optical link analysis based on the first PPE and the second PPE may be generated. In some embodiments, the optical link analysis may indicate one or more locations along the optical link that apply a gain or a loss to optical signals propagating through the optical link. The gain may amplify the optical signals. The loss may attenuate the optical signals. In these and other embodiments, the optical link analysis may be generated such as described above with respect to FIGS. 1A and 1C.

Generating the optical link analysis may include using the first PPE for the optical link analysis for portions of the optical link at which the first PPE is greater than the second PPE and using the second PPE for the optical link analysis for portions of the optical link at which the second PPE is greater than the first PPE. Further, the first PPE or the second PPE may be used for the optical link analysis at one or more locations along the optical link at which the first PPE equals the second PPE.

According to one or more embodiments of the present disclosure, the generating of the optical link analysis may include applying a weighting factor to the first PPE and/or the second PPE, for example, such as discussed with respect to FIGS. 1A-1C. Further, generating the optical link analysis may include applying a mathematical operation to the first PPE and/or the second PPE. In some embodiments, the mathematical operation may include applying one or more derivatives to the first PPE and/or the second PPE.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 200 may include additional blocks or fewer blocks.

Figure 3:
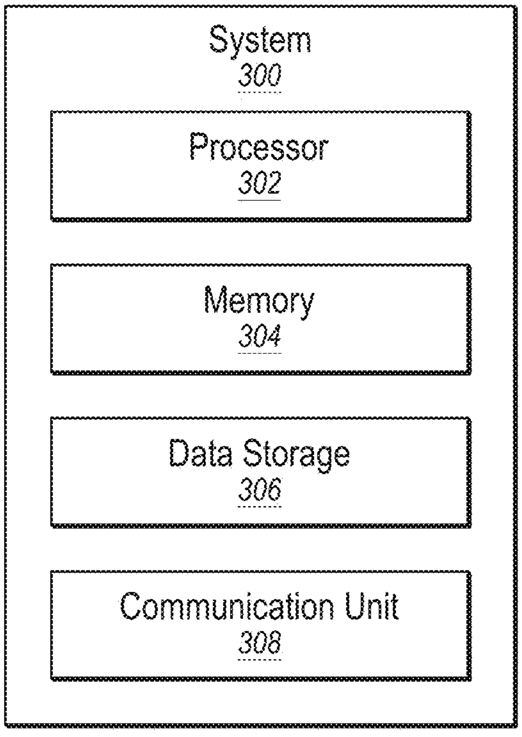
FIG. 3 illustrates a block diagram of an example computing system according to one or more embodiments of the present disclosure.

FIG. 3 illustrates a block diagram of an example computing system according to one or more embodiments of the present disclosure. The computing system 300 may include a processor 302, a memory 304, a data storage 306, and/or a communication unit 308, which all may be communicatively coupled. For example, the module 100 of FIG. 1 may be implemented as a computing system consistent with the computing system 300.

Generally, the processor 302 may include any suitable special-purpose or general-purpose computer, computing entity, or processing device including various computer hardware or software modules and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 3, it is understood that the processor 302 may include any number of processors distributed across any number of network or physical locations that are configured to perform individually or collectively any number of operations described in the present disclosure. In some embodiments, the processor 302 may interpret and/or execute program instructions and/or process data stored in the memory 304, the data storage 306, or the memory 304 and the data storage 306. In some embodiments, the processor 302 may fetch program instructions from the data storage 306 and load the program instructions into the memory 304.

After the program instructions are loaded into the memory 304, the processor 302 may execute the program instructions, such as instructions to cause the computing system 300 to perform some of the operations of the method 200 of FIG. 2. For example, the computing system 300 may execute program instructions to obtain a first PPE, to obtain a second PPE, and/or to generate an optical link analysis.

The memory 304 and the data storage 306 may include computer-readable storage media or one or more computer-readable storage mediums for having computer-executable instructions or data structures stored thereon. Such computer-readable storage media may be any available media that may be accessed by a general-purpose or special-purpose computer, such as the processor 302. In some embodiments, the computing system 300 may or may not include either of the memory 304 and the data storage 306.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a particular operation or group of operations.

The communication unit 308 may include any component, device, system, or combination thereof that is configured to transmit or receive information over a network. In some embodiments, the communication unit 308 may communicate with other devices at other locations, the same location, or even other components within the same system. For example, the communication unit 308 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 308 may permit data to be exchanged with a network and/or any other devices or systems described in the present disclosure. For example, the communication unit 308 may allow the computing system 300 to communicate with other systems, such as computing devices and/or other networks.

One skilled in the art, after reviewing this disclosure, may recognize that modifications, additions, or omissions may be made to the computing system 300 without departing from the scope of the present disclosure. For example, the computing system 300 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:

obtaining a first power profile estimation (PPE) for a first optical signal propagating through an optical link in a first direction;

obtaining a second PPE for a second optical signal propagating through the optical link in a second direction opposite the first direction; and generating an optical link analysis based on the first PPE and the second PPE, the optical link analysis indicating one or more locations along the optical link that apply one or more of a gain or a loss to optical signals propagating through the optical link, wherein the optical link analysis is generated using the first PPE for the optical link analysis for portions of the optical link at which the first PPE is greater than the second PPE and using the second PPE for the optical link analysis for portions of the optical link at which the second PPE is greater than the first PPE.

2. The method of claim 1, wherein one or more of the first PPE or the second PPE is used for the optical link analysis at a location along the optical link at which the first PPE equals the second PPE.

3. The method of claim 1, wherein generating the optical link analysis includes applying a weighting factor to one or more of the first PPE or the second PPE.

4. The method of claim 3, wherein the weighting factor is an average optical signal power calculation comprising one or more of the first PPE or the second PPE for one or more locations along the optical link divided by the combined optical signal power of the first PPE and the second PPE for the one or more locations along the optical link.

5. The method of claim 1, wherein generating the optical link analysis includes applying a mathematical operation to one or more of the first PPE or the second PPE.

6. The method of claim 5, wherein applying the mathematical operation comprises applying one or more derivatives to one or more of the first PPE or the second PPE.

7. A system comprising:

at least a first transceiver configured to obtain a first power profile estimation (PPE) for a first optical signal propagating through an optical link in a first direction;

at least a second transceiver configured to obtain a second PPE for a second optical signal propagating through the optical link in a second direction opposite the first direction; and a computing system configured to generate an optical link analysis based on the first PPE and the second PPE, the optical link analysis indicating one or more locations along the optical link that apply one or more of a gain or a loss to optical signals propagating through the optical link, wherein the optical link analysis is generated using the first PPE for the optical link analysis for portions of the optical link at which the first PPE is greater than the second PPE and using the second PPE for the optical link analysis for portions of the optical link at which the second PPE is greater than the first PPE.

8. The system of claim 7, wherein one or more of the first PPE or the second PPE is used for the optical link analysis at a location along the optical link at which the first PPE equals the second PPE.

9. The system of claim 7, wherein generate the optical link analysis includes applying a weighting factor to one or more of the first PPE or the second PPE.

10. The system of claim 9, wherein the weighting factor is an average optical signal power calculation comprising one or more of the first PPE or the second PPE for one or more locations along the optical link divided by the combined optical signal power of the first PPE and the second PPE for the one or more locations along the optical link.

11. The system of claim 7, wherein generate the optical link analysis includes applying a mathematical operation to one or more of the first PPE or the second PPE.

12. The system of claim 11, wherein applying the mathematical operation comprises applying one or more derivatives to one or more of the first PPE or the second PPE.

13. One or more non-transitory computer-readable storage media storing instructions that, in response to being executed by one or more processors cause a system to perform operations, the operations comprising:

obtaining a first power profile estimation (PPE) for a first optical signal propagating through an optical link in a first direction;

obtaining a second PPE for a second optical signal propagating through the optical link in a second direction opposite the first direction; and generating an optical link analysis based on the first PPE and the second PPE, the optical link analysis indicating one or more locations along the optical link that apply one or more of a gain or loss to optical signals propagating through the optical link, wherein the optical link analysis is generated using the first PPE for the optical link analysis for portions of the optical link at which the first PPE is greater than the second PPE and using the second PPE for the optical link analysis for portions of the optical link at which the second PPE is greater than the first PPE.

14. The one or more non-transitory computer-readable storage media of claim 13, wherein one or more of the first PPE or the second PPE is used for the optical link analysis at a location along the optical link at which the first PPE equals the second PPE.

15. The one or more non-transitory computer-readable storage media of claim 13, wherein generating the optical link analysis including applying a weighting factor to one or more of the first PPE or the second PPE.

16. The one or more non-transitory computer-readable storage media of claim 15, wherein the weighting factor is an average optical signal power calculation comprising one or more of the first PPE or the second PPE for one or more locations along the optical link divided by the combined optical signal power of the first PPE and the second PPE for the one or more locations along the optical link.

17. The one or more non-transitory computer-readable storage media of claim 13, wherein generating the optical link analysis includes applying a mathematical operation to one or more of the first PPE or the second PPE.

* * * * *